Oct. 28, 1924.
R. NICEWARNER ET AL
EXPANSIBLE BOLT
Filed Nov. 25, 1922
1,513,669
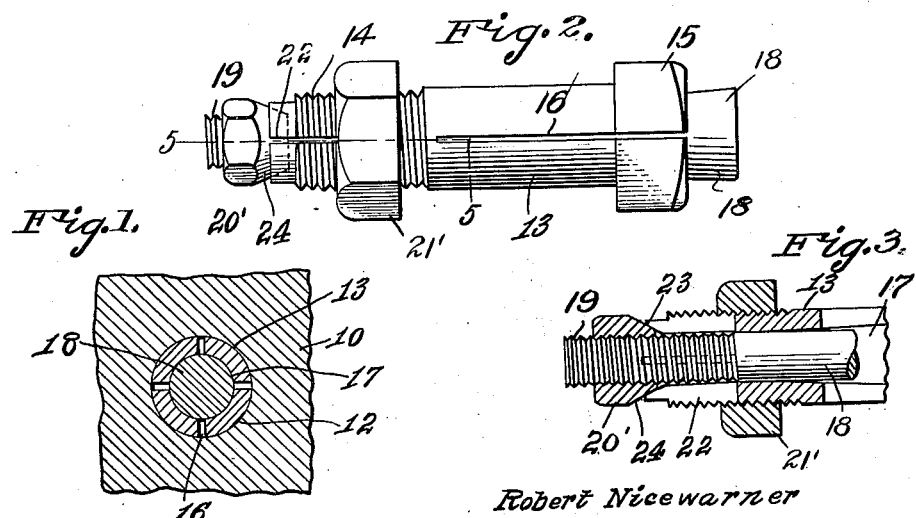
Robert Nicewarner
R. C. Smithson INVENTOR
BY *Victor J. Evans*
ATTORNEY
WITNESS:

Patented Oct. 28, 1924.

1,513,669

UNITED STATES PATENT OFFICE.

ROBERT NICEWARNER AND RUMSEY C. SMITHSON, OF CHARLES TOWN, WEST VIRGINIA.

EXPANSIBLE BOLT.

Application filed November 25, 1922. Serial No. 603,254.

*To all whom it may concern:*

Be it known that we, ROBERT NICEWARNER and RUMSEY C. SMITHSON, citizens of the United States, residing at Charles Town, in the county of Jefferson, and State of West Virginia, have invented new and useful Improvements in Expansible Bolts, of which the following is a specification.

This invention relates to improvements in expansible bolts and has for an object the provision of a bolt of this type which is especially adapted for use in structural iron work as a substitute for rivets, the construction being such that the bolt will fill and tightly grip the wall of the hole to prevent independent movement between the connected members.

Another object of the invention is the provision of an expansible bolt wherein the nut engaging end may also be expanded, so that after the nut has been set up, it will be securely held against accidental displacement.

With the above and other objects in view, the invention further includes the following novel features and details of construction, to be hereinafter more fully described, illustrated in the accompanying drawings and pointed out in the appended claims.

In the drawings:—

Figure 1 is an elevation of an expansible bolt constructed in accordance with the invention.

Figure 2 is a transverse section on the line 2—2 of Figure 1.

Figure 3 is a section on the line 3—3 of Figure 1.

Referring in detail to the drawings, wherein like characters of reference denote corresponding parts, the reference character 10 indicates the member used for illustrating the application of the invention, the said member being provided with a registering opening 12, through which the improved bolt extends.

This bolt comprises a hollow cylindrical member 13, which is threaded at one end as shown at 14 and which is provided at its opposite end with a head 15. Extending longitudinally through the headed end of the bolt are spaced slots 16, which permit of this end of the bolt being expanded, in order to accomplish this expansion, the member 13 is provided with a tapered bore 17 into which the slots 16 extend.

Removably positioned within the bore 17 of the member 13 is an expander which is in the form of a tapered pin 18, which has extending from its reduced end a threaded cylindrical portion 19, for the reception of a nut 20'.

In the use of the invention, the bolt is positioned within an opening and the expander placed within the hollow cylindrical member 13. The expander may then be struck on its large end so as to force the same within the tapered bore 17 and the nut 20' set up tightly against the threaded end of the member 13. The cylindrical member 13 will thus be expanded so as to tightly grip the walls of the opening 12 so that relative movement in the member 10 will be prevented. A nut 20' serves to hold the bolt in place in the usual manner.

In Figures 1 and 2 of the drawings, the hollow cylindrical member 13 is shown as being provided at its threaded end with longitudinally disposed slots 22 and this end of the hollow cylindrical member is inwardly beveled as shown at 23. The nut 20' which engages the threaded end of the expander 18 has its inner face cone-shaped as shown at 24 and this cone-shaped face is adapted to enter and engage the beveled end 23 of the hollow cylindrical member so as to expand this end of the said member and prevent accidental movement of the nut 21'. This will positively insure the retention of the bolt in its proper place, so that the said bolt will possess all of the advantages of a rivet while possessing none of its disadvantages. In addition, the bolt may be tightened without removal, when necessary to take up wear, while to accomplish this, a rivet must be removed. At the same time, the bolt may be removed when desired, without the necessity of cutting the head or nut.

Having described the invention what is claimed is:—

1. In a device of the character described comprising a hollow cylindrical member slotted at each end and externally threaded for a portion of its length, and a threaded expander passing through said cylindrical member, a tapered nut on said expander engaging the threaded end of said hollow cylindrical member, a second nut on the extending threaded portion of said hollow cylindrical member, 2. A device of the character described comprising a hollow cylindrical member slotted at each end and externally threaded for an appreciable portion of its length, a nut threadedly engaging the threaded portion of said hollow cylindrical member, a threaded expander passing through said hollow cylindrical member, a tapered nut on said expander engaging the threaded portion of said hollow cylindrical member as for the purpose specified.

3. An expansible bolt comprising a hollow cylindrical member having longitudinally disposed slots at one end and threaded at its opposite end and having longitudinally disposed slots at its threaded end, a nut on said threaded end, an expander removably positioned within the hollow cylindrical member, and a cone faced nut threadedly engaging one end of the expander and entering the threaded end of the hollow cylindrical member, whereby said end may be expanded for the retention of the cone faced nut.

In testimony whereof, we affix our signatures.

ROBERT NICEWARNER.
RUMSEY C. SMITHSON.